Jan. 25, 1938.   L. W. DOWNWARD   2,106,371
ROTARY STEAM ENGINE
Original Filed Aug. 14, 1933    7 Sheets-Sheet 2
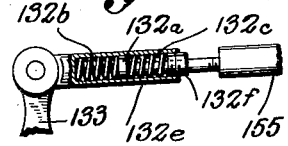
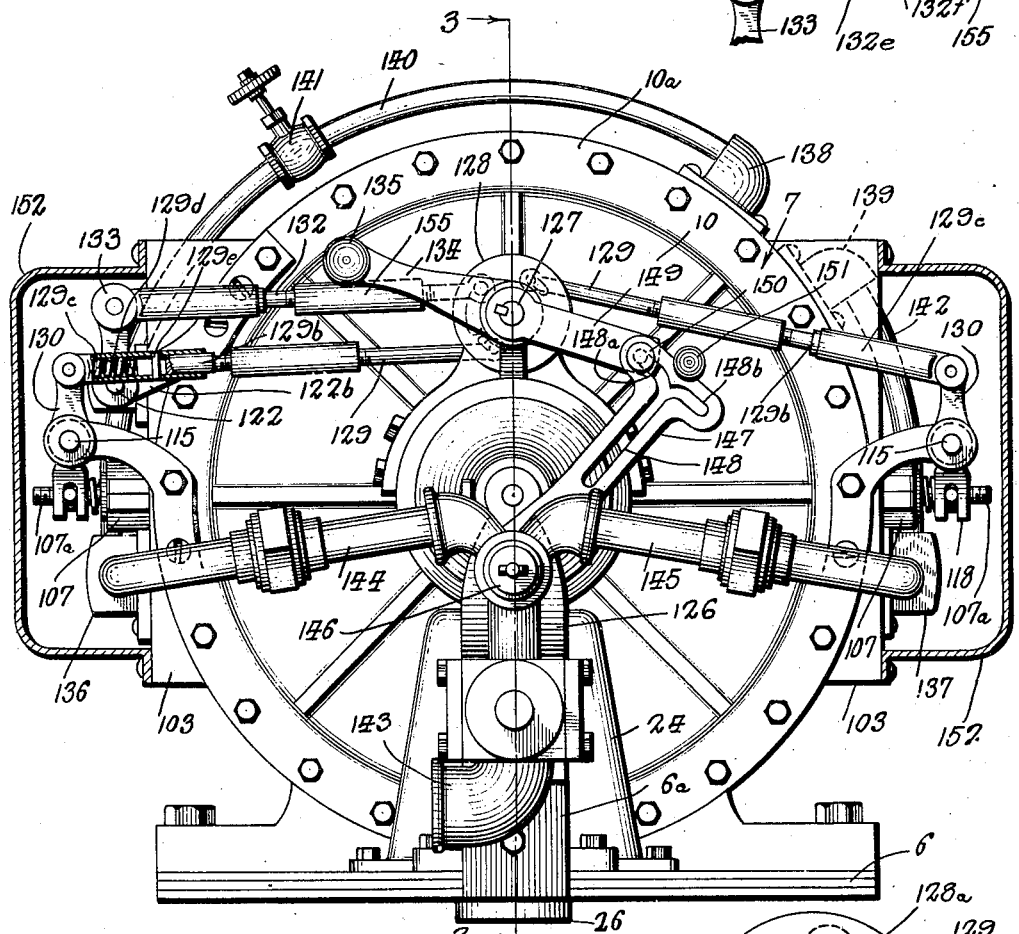
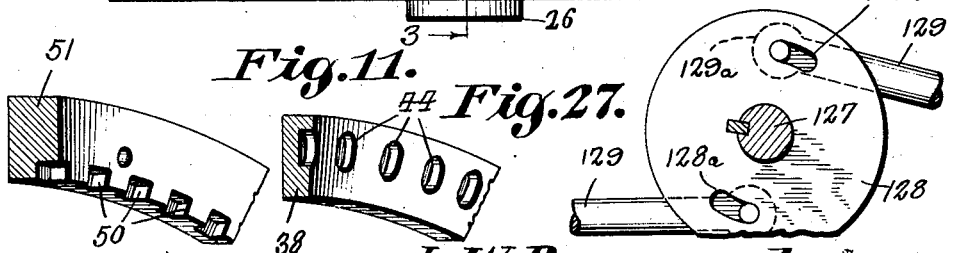

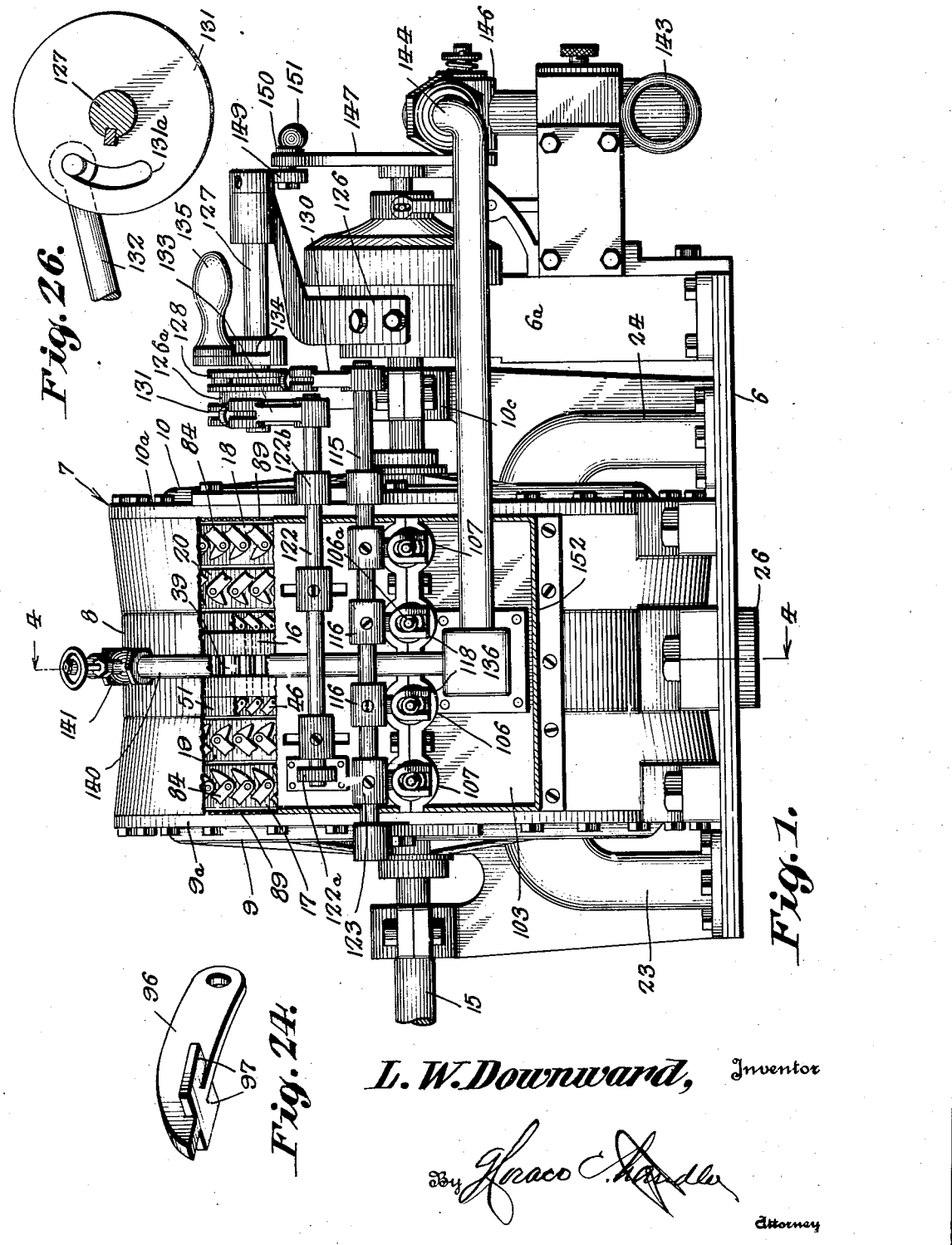

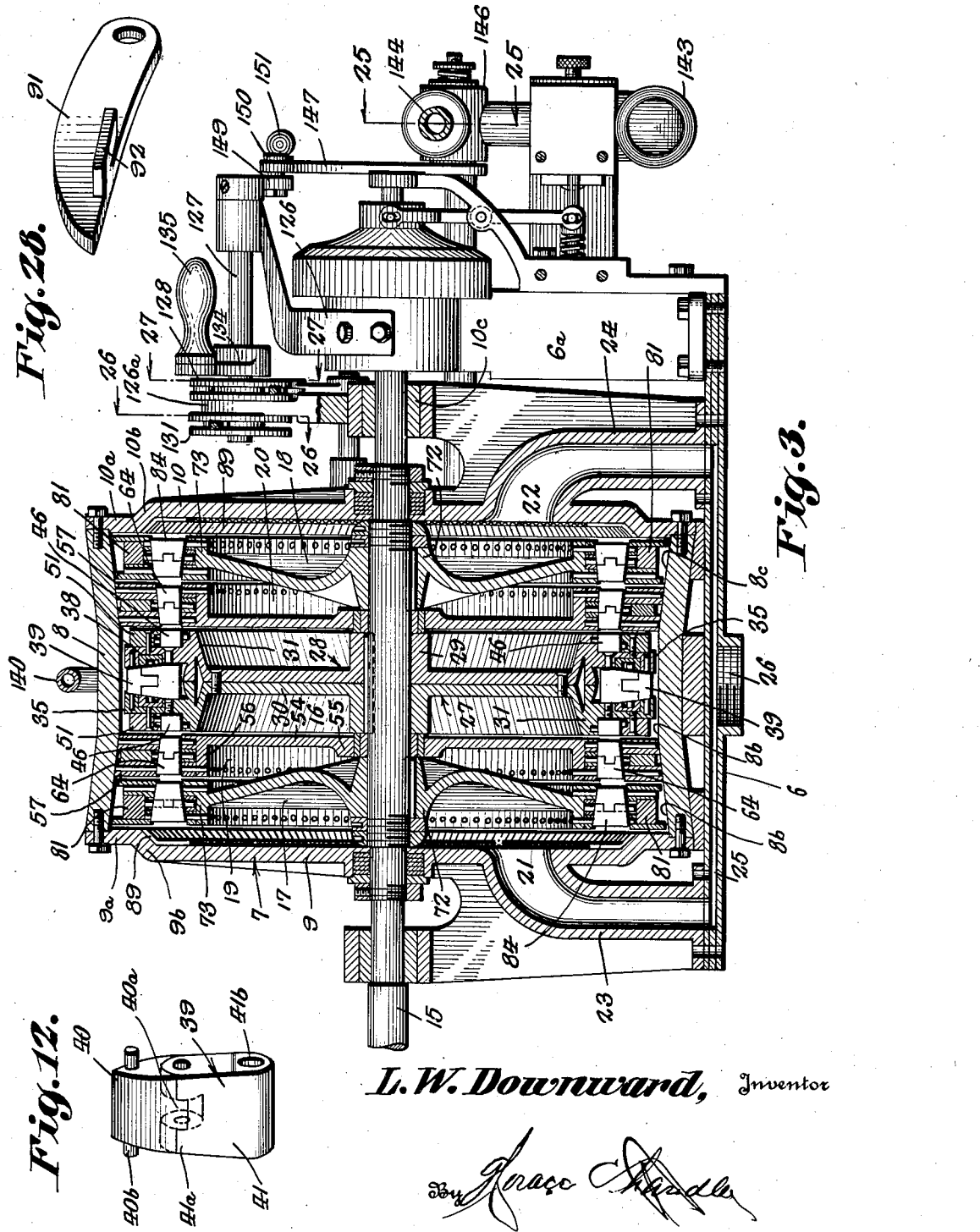

Jan. 25, 1938.   L. W. DOWNWARD   2,106,371
ROTARY STEAM ENGINE
Original Filed Aug. 14, 1933   7 Sheets-Sheet 4

L. W. Downward, Inventor

By Horace C. [signature]
Attorney

Jan. 25, 1938.  L. W. DOWNWARD  2,106,371
ROTARY STEAM ENGINE
Original Filed Aug. 14, 1933  7 Sheets-Sheet 5
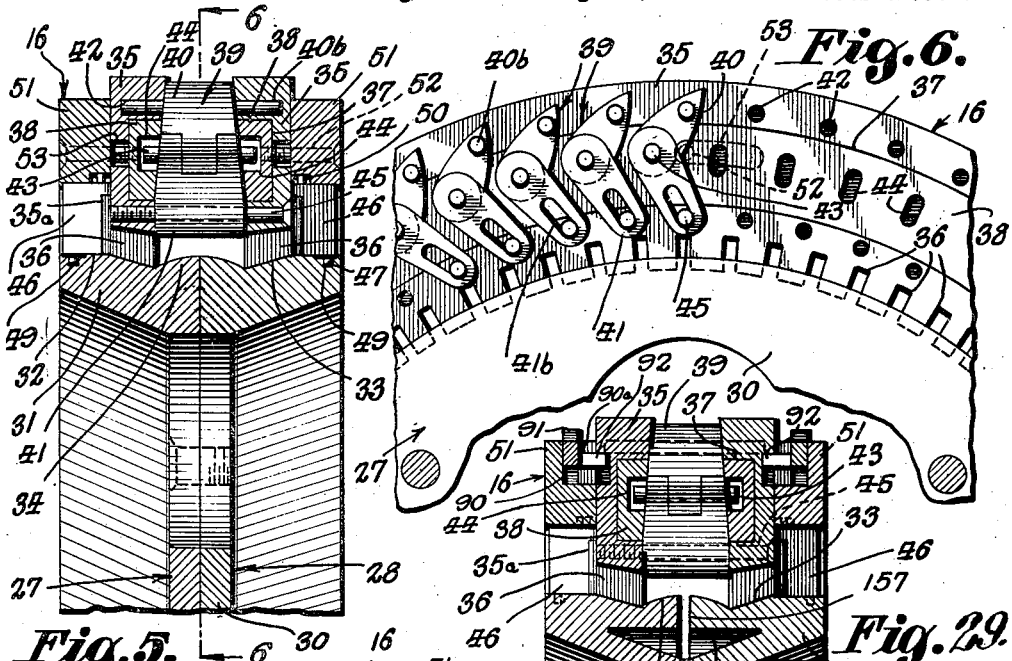
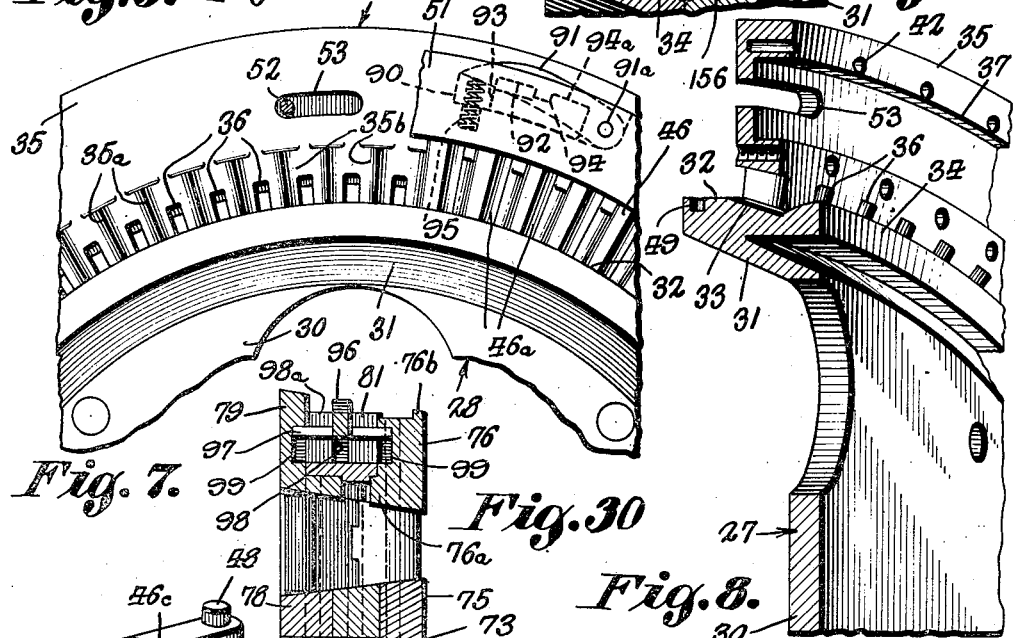
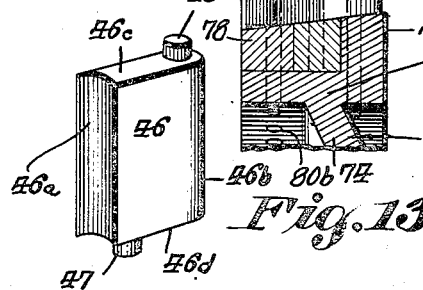
L. W. Downward, Inventor.

Jan. 25, 1938.  L. W. DOWNWARD  2,106,371
ROTARY STEAM ENGINE
Original Filed Aug. 14, 1933   7 Sheets-Sheet 6
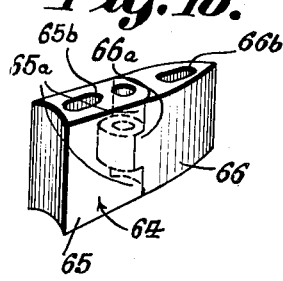
Fig. 18.
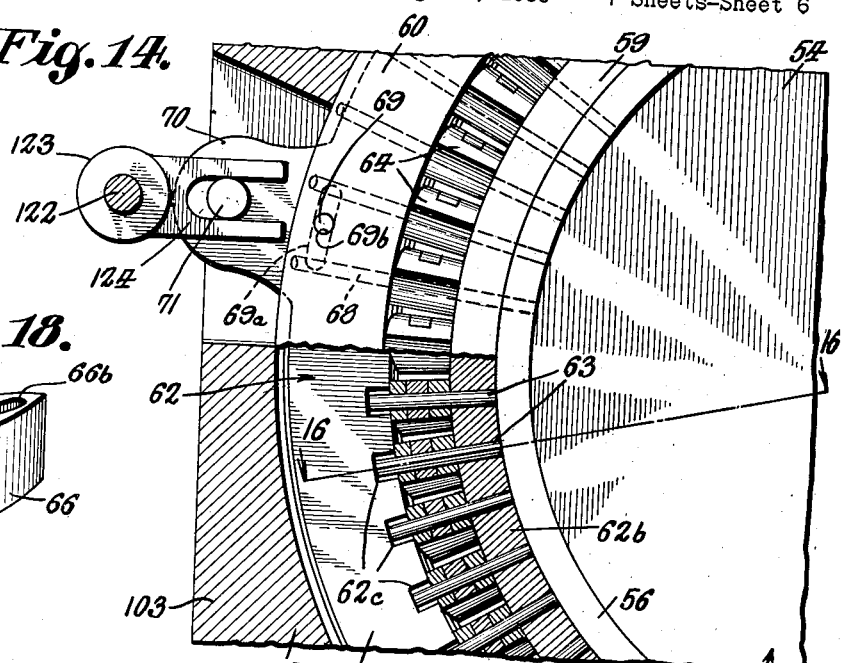
Fig. 14.
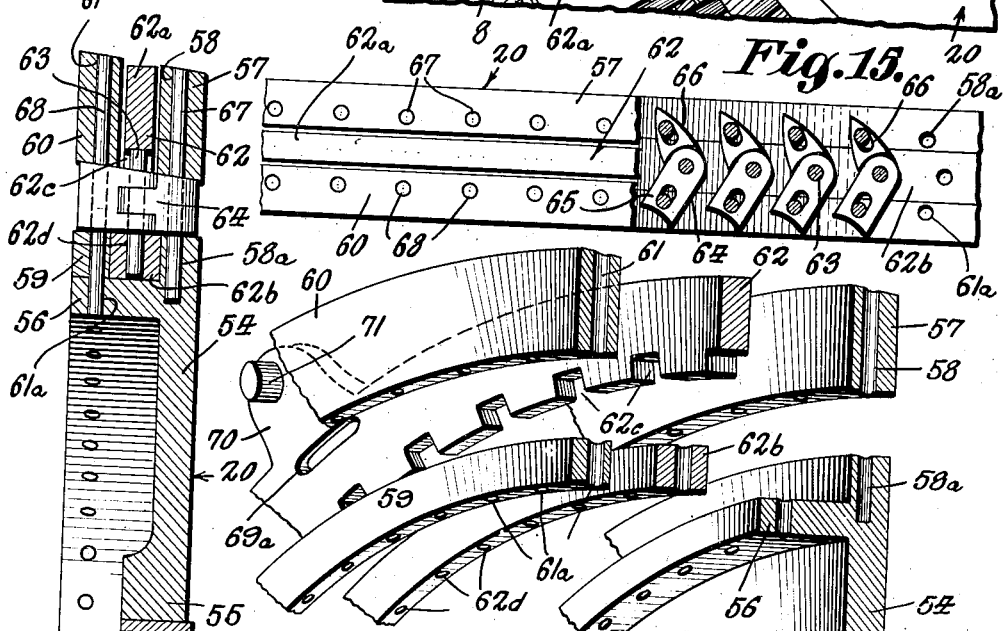
Fig. 15.
Fig. 16.
Fig. 17.
L. W. Downward, Inventor Jan. 25, 1938.　　　L. W. DOWNWARD　　　2,106,371
ROTARY STEAM ENGINE
Original Filed Aug. 14, 1933　　　7 Sheets-Sheet 7
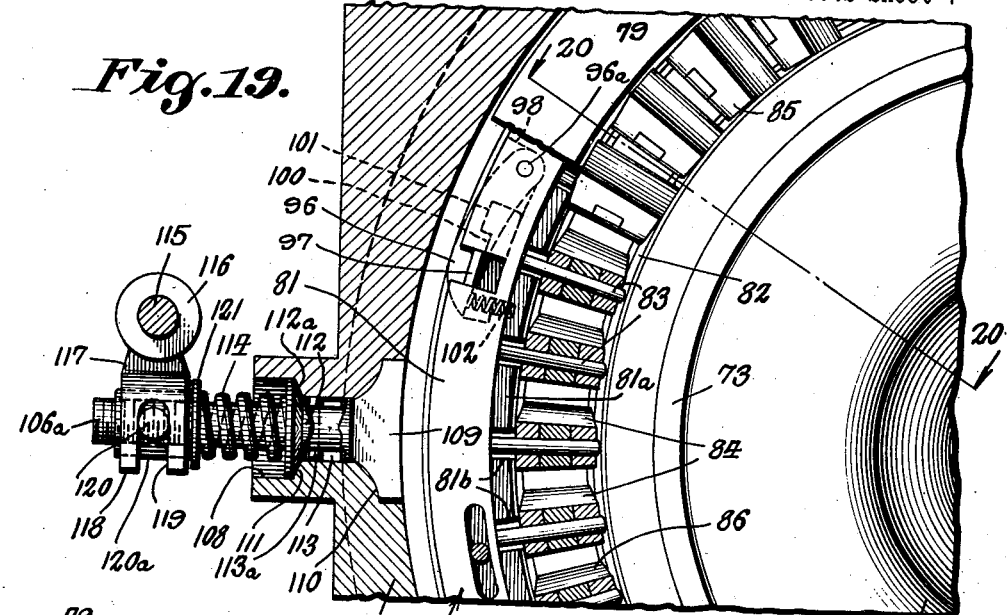
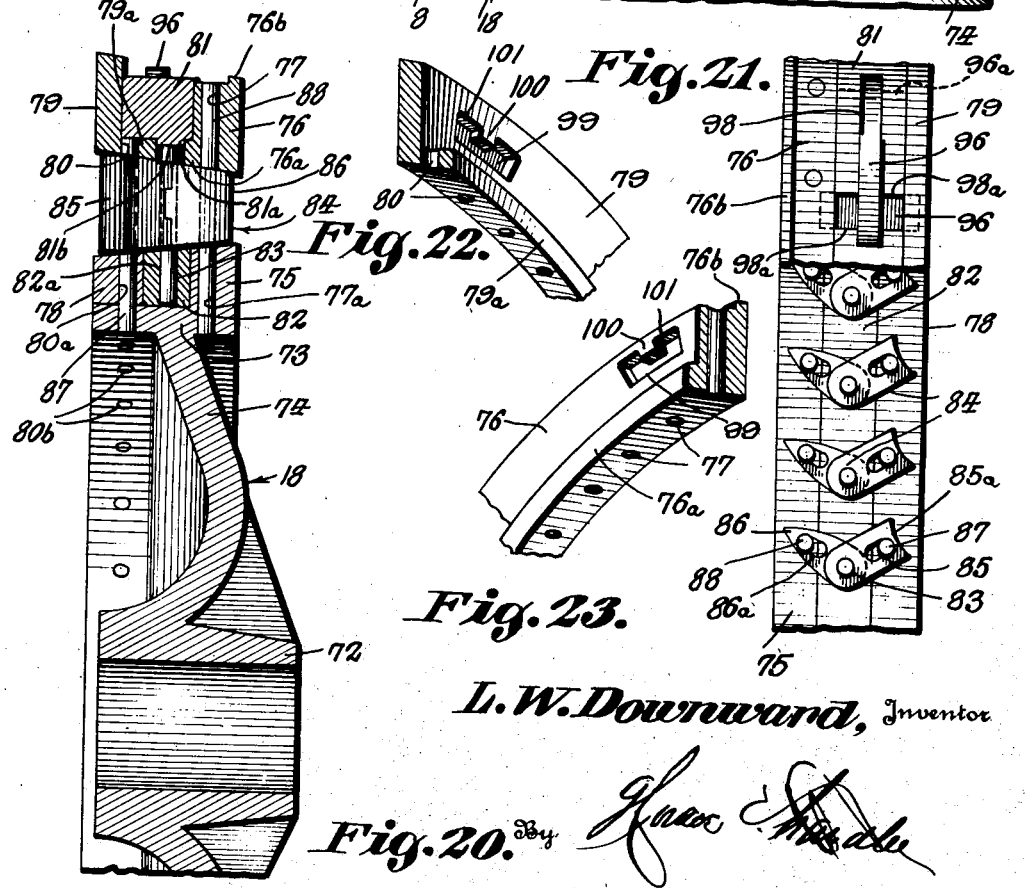
L. W. Downward, Inventor Patented Jan. 25, 1938

2,106,371

UNITED STATES PATENT OFFICE 2,106,371

ROTARY STEAM ENGINE

Leslie W. Downward, Wilmington, Del., assignor to The Downward Turbine Corporation, Wilmington, Del., a corporation of Delaware Application August 14, 1933, Serial No. 685,139
Renewed September 16, 1936

21 Claims. (Cl. 253—44)

This invention relates to rotary steam engines of the combined impact and expansion type, and particularly to such engines as include a group of rotors connected to a common shaft, within a casing, and adapted to receive steam successively, one from another.

An object of the invention is to provide an engine of the type mentioned which shall be so constructed as to permit of the steam being first admitted to the center rotor and then distributed, in opposite directions, to the remaining rotors.

Another object is to provide reversing mechanism for an engine of the type mentioned, whereby the same may be reversed when operating at a high rate of speed.

A further object is to provide a novel stator and a novel rotor for steam engines of the type mentioned.

With these objects in view, as well as others which will be apparent as the description proceeds, the invention resides in the construction now to be described, and illustrated in the accompanying drawings in which Figure 1 is a side elevation with a part broken away and part in section.

Figure 2 is an end view with parts in section.

Figure 3 is a vertical, longitudinal section on the line 3—3 of Figure 2, with parts in elevation.

Figure 4 is a sectional view taken on the line 4—4 of Figure 1.

Figure 5 is a vertical longitudinal fragmentary section through the center or primary rotor.

Figure 6 is a section on line 6—6 of Figure 5.

Figure 7 is a view showing one side of a flange of the center rotor with other parts of the center rotor in elevation.

Figure 8 is a perspective view showing the opposite side of the center rotor flange.

Figure 9 is a horizontal section through the ports of the center rotor with other parts of the rotor in elevation.

Figure 10 shows the construction of the outer reversing rings of the center rotor.

Figure 11 illustrates the inner reversing rings of the center rotor.

Figure 12 illustrates an inner primary blade, in detail.

Figure 13 illustrates an outer primary blade, in detail.

Figure 14 is a side elevation of a portion of one of the stators, with a part broken away.

Figure 15 illustrates the marginal face of one of the stators with a part broken away to expose the blades.

Figure 16 is a section on line 16—16 of Figure 14.

Figure 17 is a view of the marginal portion of a stator with its parts separated.

Figure 18 is a detail view illustrating one of the stator blades.

Figure 19 is a fragmentary view showing a side of a marginal portion of one of the secondary rotors, with a part broken away, also illustrating a portion of the engine casing.

Figure 20 is a sectional view taken on the line 20—20 of Figure 19.

Figure 21 illustrates the marginal face of a secondary rotor with a part broken away.

Figure 22 is a fragmentary view illustrating a portion of the inner face of one of the rings of a secondary rotor.

Figure 23 is a similar view of another ring of a secondary rotor.

Figure 24 is a detail view illustrating a secondary rotor latch.

Figure 25 is a detail view of the throttle valve.

Figure 26 is a detail view illustrating a portion of the mechanism for manipulating the stator blades.

Figure 27 is a similar view of a portion of the mechanism for manipulating the rotor blades.

Figure 28 is a detail view illustrating one of the primary rotor latches.

Figure 29 is a detail view showing the latch mechanism of the primary rotor, together with a modified form of rim.

Figure 30 illustrates the latch mechanism of a secondary rotor.

Figure 31 is a detail view.

As shown in the drawings, 6 represents the engine base which supports a casing 7 formed of a rim member 8 having cover plates 9 and 10 secured to and closing its opposite ends. This rim member, as will be clearly seen in Figure 3, is flared outwardly from its central portion, in opposite directions, along straight lines, so that the inner face 8a of the central portion is transversely flat, while the flared marginal portions present inner faces 8b and 8c, at an angle to the face 8a. Formed through the face 8a are the inclined steam inlet ports 11, 12, 13, and 14. Extending axially of the rim member, and journaled in steam-tight bearings at the centers of the cover plates, is the drive-shaft 15, to which the rotors are keyed or otherwise secured. While an engine of the present type may be provided with any number of rotors, within the limit of expansion of the steam employed, the form now illustrated and described will be limited to three, as to increase the number will require only a change in the dimensions of certain parts and a duplication of others.

The group of three rotors includes a center or primary rotor 16 and two secondary rotors 17 and 18, positioned at opposite sides of the primary rotor and spaced therefrom. The secondary rotors are identically constructed and interposed between them and the primary rotor, one at either side of the latter, are the identically constructed stators, 19 and 20. The peripheries of the rotors are spaced from the casing rim only to a sufficient degree to prevent friction during rotation and a similar space exists between the sides of the rotors and stators but the latter are securely attached or anchored to the rim 8, to prevent their rotation. The inner faces of the cover plates 9 and 10 are so constructed as to act as stators also, the details of which construction will be described later herein. These cover plates 9 and 10 are provided with exhaust ports 21 and 22, respectively, having the exhaust pipes 23 and 24 which communicate with the atmosphere through the medium of an exhaust passage 25, formed in the base, and having an outlet 26.

The central or primary rotor 16, illustrated in detail in Figures 3 to 12, is the first to receive the steam. It includes two identically constructed sections 27 and 28, each consisting of a hub portion 29, keyed to the shaft 15, a web portion 30 and a rim portion 31, the web portion being connected to the hub and rim portions at one side thereof, so that when the hub and rim portions are brought into contact, the webs will also contact, as shown in Figures 3 and 5. They are thus held by means of screws or other suitable fastening means passing through the webs.

The outer face of the rim of the primary rotor 16 has the marginal transversely flat portions 32 and inwardly inclined portions 33, terminating at a central circumscribing arcuate rib 34. Extending radially from each of the inclined portions 33 is a flange 35 having a continuous series of transverse ports 36 at its base and in the inner opposed faces of these flanges, outwardly of the said ports, are continuous channels 37 in which are rotatably mounted the inner reversing rings 38. By reference to Figures 7 and 9 it will be seen that those portions of the outer faces of the flanges 35, lying between the ports 36 and extending outwardly therefrom for an approximately equal distance, are gradually raised towards their centers, along inwardly curved lines, to produce radial ribs 35a bounded at opposite sides by elongated pockets 35b.

Mounted on the flanges 35, and extending entirely around the primary rotor, is a series of inner primary blades 39, one of which is shown in detail in Figure 12. Each of these blades includes an outer wedge-shaped section 40 and an inner section 41, adapted to be hinged together, the latter section having spaced perforated ears 41a, between which is an ear 40a formed on the section 40. The extremities of these ears are rounded and fit snugly in corresponding recesses in the adjacent faces of the sections, to form a practically steam-tight joint therebetween. The section 40 is provided with oppositely extending trunnions 40b and the section 41 has an elongated passage 41b extending therethrough. These trunnions 40b are snugly pivoted in oppositely arranged sockets 42 formed in the inner faces of the flanges 35 so as to support the sections 40, the sections 41 being supported from the sections 40 by means of pivot pins 43 passing through the perforations of the ears 40a and 41a of the blade sections and projecting therebeyond, at both sides, the projecting ends being seated in radially elongated sockets 44 (see Figure 11) in the mutually opposite faces of the inner reversing rings 38. Screws 45 pass through one of the flanges 35 and are threaded onto the other flange, with their intermediate portions passing through the elongated passages 41b of the blade sections 41, to form rock shafts for the latter.

Positioned on each side of the transversely flat portions 32 of the rim 31, and extending entirely therearound, is a series of primary reversing blades 46, one of which is illustrated in detail in Figure 13. These reversing blades are identically constructed and include a rectangular body having opposite concave and convex marginal faces 46a and 46b, respectively, and flat upper and lower marginal faces 46c and 46d. Projecting from these latter faces, in staggered relation, are trunnions 47 and 48. The trunnions 47 rest in sockets 49 in the faces 32, while the trunnions 48 are positioned for sliding and pivotal movement in elongated sockets 50, formed in the under faces of a pair of outer reversing rings 51, rotatably mounted against and slidably contacting with the outer radial faces of the flanges 35. As shown in Figure 10, the sockets 50 open into both the inner marginal face and the inner radial face of each of the rings 51. The outer and inner reversing rings 51 and 38 are connected together by screws 52, which pass through slots 53, in the flanges 35.

Mounted at opposite sides of the primary rotor 16 and rigidly secured to the flaring faces 8b and 8c of the casing rim 8 are the stators 19 and 20, and, as these are identically constructed, a description of one will suffice for both. As shown particularly in Figures 14 to 18, the stator 19 comprises a disk 54 having a central hub 55, in which the shaft 15 rotates, and a laterally projecting circumscribing shoulder 56, spaced inwardly from its periphery. Spaced outwardly from the periphery of the disk 54, concentric therewith and slightly thicker than the said disk, is a stator ring 57 having a series of radial perforations 58, entirely therearound and in line with a series of corresponding pockets 58a in the peripheral face of the said disk. Snugly fitting the shoulder 56, at its outer end, is a ring 59 and spaced outwardly from this ring, concentric therewith, is a second stator ring 60. Extending entirely around this stator ring is a series of radial perforations 61, in line with a similar series of perforations 61a in the ring 59 and continuing through the shoulder 56.

Rotatably mounted on the shoulder 56, between the stator rings 57 and 60, is a stator blade reversing ring 62 formed of two spaced concentric outer and inner sections 62a and 62b, respectively, the former having a continuous series of rectangular notches 62c in its inner peripheral face, these notches being in alignment with a corresponding series of radial perforations 62d in the inner section 62b. This inner section fits snugly, but slidably, between the margin of the disk 54 and the ring 59, but the outer ring-section 62a is somewhat more loosely fitted between the rings 57 and 59, with its outer and inner marginal faces inset, with respect to the corresponding faces of the said rings. By referring to Figure 16, it will be seen that the outer peripheral faces of ring 59, the inner ring section 62b, and the disk 54, are in horizontal alignment and are in a plane parallel with the axis of the shaft, while the adjacent inner faces of the rings 58 and 60 are aligned at a slight angle thereto. It will also be seen that the outer peripheral faces of these latter rings are cut at an angle so as to tightly fit the flaring face 8b of the casing rim 8.

Mounted on pivot pins 63, each having an end supported in one of the perforations 62d and an end resting in one of the notches 62c, are stator blades 64, one of which is illustrated in detail in Figure 18. These stator blades are formed of two sections 65 and 66, the latter being wedge-shaped and being hinged to the former by an ear 66a formed thereon and positioned between two ears 65a on the former section, these ears being perforated to receive the pivot pins 63. The blade sections 65 and 66 are provided with slots 65b and 66b, respectively, parallel with the perforations of the ears. Passing through the slots 66b are anchor pins 67, having their ends tightly fitted in the perforations 58 and pockets 58a, and passing through the slots 65b are similar pins 68 having their ends tightly fitted in the perforations 61 and 61a. While the outer end face of the blade section 66 is brought to a comparatively sharp edge, as illustrated, the corresponding end of the adjoining section is concave and faces in the direction of travel of the steam. As shown in Figure 16, these stator blades fit snugly in the space between the rings 58 and 60, and the ring 59, the reversing-ring section 62b and the disk 54. Equally spaced around the stator, near the margin thereof, are a suitable number of stop-pins 69 passing through slots 69a in the reversing-ring section 62a, and having their ends tightly fitted in openings 69b in the rings 57 and 60. Projecting radially from the outer edge of the reversing-ring section 62a is an ear 70 having a transverse pin 71 for a purpose to be set forth later herein.

Secured to the drive shaft 15, beyond the stators 19 and 20, are the secondary rotors 17 and 18. As these are also identically constructed, one only will be described. The secondary rotor 17, which is illustrated in detail in Figures 19 to 24, includes a hub 72 and a rim 73, connected by a dished web 74. By reference to Figure 20, it will be noted that the hub portion is somewhat longer than the width of the rim and is slightly offset with respect thereto, so that one of its ends projects into the stator 19, as shown in Figure 3, and bears against its relatively short hub portion 55. On one side of the rim 73 is a radial flange 75 and outwardly of this is a concentrically spaced ring 76, having a laterally projecting continuous shoulder 76a at the base of its inner wall, and a continuous flange 76b projecting radially from its periphery. The ring 76 has a series of equally spaced perforations 77 entirely therearound, in register with a corresponding series of perforations 77a through the flange 75.

Positioned on the rim 73, at its outer edge, and spaced from the flange 75, is a removable ring 78 and outwardly of this ring, in concentrically spaced relation thereto, is a ring 79 having a laterally projecting continuous shoulder 79a at its base. Extending entirely around this shoulder is a series of equally spaced radial perforations 80 in line with similar perforations 80a and 80b, through the ring 78 and the adjacent portion of the rim 73. Rotatably mounted between the rings 76 and 79, and resting on the aligned outer faces of their shoulders 76a and 79a, is an outer reversing-ring 81 having a rectangular rib 81a projecting from its inner marginal face and extending downwardly between the shoulders 76a and 79a and in contact therewith. This rib 81a is cut through from side to side to form pockets 81b bounded at their opposite sides by the opposing faces of the said shoulders. An inner reversing-ring 82 rotates on the rim 73, between the parts 75 and 78, and is provided with a continuous series of perforations 82a, in line with the pockets 81b of the outer reversing-ring.

Mounted on pivot pins 83, having their inner ends tightly fitted in the perforations 82a of the inner reversing-ring, and their ends accommodated in the pockets 81b, are secondary rotor blades 84, identical in construction to the stator blades 64, illustrated in Figure 18. These are formed of the hinged sections 85 and 86, the former corresponding in shape to the section 65 of the stator blade 64, and the latter corresponding in shape to the section 66 of the same. The section 85 has a slot 85a, and the section 86 a slot 86a, and passing through the former slot, with its ends tightly held in the perforations 80 and 80a is an anchor pin 87, a similar pin 88 having its ends correspondingly held in the perforations 77 and 77a, with its intermediate portion loosely positioned in the slot 86a.

By referring to Figure 3 of the drawings, it will be seen that the cover plates 9 and 10 of the engine casing are dished, resulting in marginal portions 9a and 10a, for attachment to the casing rim 8, and inclined intermediate portions 9b and 10b. Also, as shown in Figure 3, the inner face of each of these cover plates is provided with a continuous series of radially disposed and relatively short ribs 89, which ribs extend inwardly from the outer edges of the inclined portions 9b and 10b, to a line slightly beyond the secondary rotor blades.

To provide means for manipulating the blades 39 and 46 of the center or primary rotor, through the medium of the inner and outer reversing rings 38 and 51, the following construction is provided: Each of the outer reversing rings 51 has a recess 90 in its marginal face, in which is a latch 91 pivoted on a pin 91a, this latch being illustrated in detail in Figure 28. As shown, the outer edge of the latch is curved and projects beyond the periphery of the reversing ring, and extending laterally from its inner edge is a wing 92 which projects outwardly from the recess 90, through an opening 90a, in the inner side wall thereof and into a recess 93 sunk in the contacting side face of the adjacent flange 35. This recess 93 has a depending lug 94 at the center of its upper wall, to form a pocket 94a, at each side thereof, these pockets being adapted to alternately receive the projecting end of the wing 92.

Engaged beneath the free end of the latch 91 is an end of a coil spring 95, its other end being seated in a recess in the ring. This spring holds the outer curved edge of the latch normally beyond the marginal face of the reversing ring 51 and in the path of a certain portion of the reversing mechanism to be described later herein. The structure just described is duplicated at the diametrically opposite edge of the primary rotor.

The secondary rotors 17 and 18 are each provided with a latch mechanism similar to that of the primary rotor. The secondary rotor latch, which is illustrated in detail in Figure 24, and which is numbered 96, is identical with the latch 91, excepting that it has a wing 97 extending from each of its sides. The latch 96 is pivoted in a recess 98 in the marginal face of the outer reversing ring, upon a pivot pin 96a, with its wings 97 projecting through openings 98a in the side walls of the recess and into recesses 99 formed in the adjacent walls of the rings 76 and 79. These recesses 99 have depending lugs 100 corresponding to the lugs 94, and at each side thereof are pockets 101 adapted to alternately receive the wings 97. A coil spring 102 bearing, at one end against the under side of the free end of the latch 96 and having its other end resting in a socket in the ring, holds the outer curved edge of the latch normally beyond the plane of the marginal face of the ring and in the path of an additional portion of the reversing mechanism to be described later. As is the case with the primary rotor, the mechanism just described is duplicated at the diametrically opposite sides of the secondary rotors.

The arrangement for manipulating the reversing ring of the rotors and stators will now be described.

As shown in Figures 2 and 4, projections 103 are formed on diametrically opposite sides of the casing rim 8 and extend completely across the outer face thereof, the casing rim being divided horizontally along the line 104, passing through these projections. The two sections of the casing rim, thus produced, are held together by means of the cover plates 9 and 10, and the joint between the two sections is rendered steam-tight, as at 105. Extending from each of the projections 103 is a series of four bosses, the inner two of each series being numbered 106 and the outer two being numbered 107, the bosses 106 being in line with the reversing rings of the center rotor, while those numbered 107 are in alignment with the reversing rings of the secondary rotors. These bosses are bored through into the engine casing, as at 108 and slidably disposed in the bores of the bosses 106 are plungers 106a, identically constructed plungers 107a being correspondingly mounted in the bores of the bosses 107. Each of these plungers has, on its inner end, a head 109, normally resting in a correspondingly shaped recess 110 in the inner face of the rim, the exposed faces of these heads being concaved to lie flush with the inner face of the casing rim. The outer portions of the bores 108 are enlarged, resulting in annular seats 111, on which rest the flared heads 112a of tubular members 112, which fit snugly within the inner portions of the bores 108, and in which the plungers are slidably disposed. The walls of these tubular members are slotted vertically at diametrically opposite points as shown at 113, and reciprocating longitudinally in these slots are the projecting ends of stop pins 113a driven through openings in the plungers. Encircling each of the plungers is a coil spring 114, having its inner end resting on the adjacent head 112a of a tubular member 112.

Mounted at each side of the casing, in bearings 9a carried by the cover plates 9 and 10 is a rock shaft 115, secured to which are collars 116, each having a radial arm 117 provided with a fork 118 straddling the outer end of a plunger rod. The legs of these forks are bifurcated as at 119 to straddle pins 120 which project from opposite sides of collars 120a threaded onto the outer ends of the plungers and positioned within the forks 118. On each plunger rod, between the outer end of its spring 114 and its collar 120a, is a washer 121. It will thus be seen that when the rock shafts 115 are manipulated the plunger rods 106a and 107a will be moved thereby so that their heads 109 will project from the recesses 110, slightly beyond the inner face of the casing rim and into the paths of travel of the latches 91 and 96.

Extending in parallel relation with one of the rock shafts 115, and above the same, is a rock shaft 122 carried by bearings 122a and 122b, the former being mounted on the adjacent projection 103 and the latter being carried by the cover plate 10. Secured to this rock shaft are two collars 123 provided with forks 124, each of which straddles one of the pins 71 carried by the ears 70 of the stator blade reversing rings 62. Thus, when the rock shaft 122 is manipulated, the reversing rings 62 will rotate.

As shown in Figures 2 and 3, a standard 6a is mounted at one end of the base 6 and receives one end of the drive shaft 15. Mounted on the upper end of this standard is a bracket 126 which supports one end of a shaft 127 having its other end supported by a bracket 126a mounted on a drive shaft bearing 10c extending from the cover plate 10. Secured to this shaft 127, at one side of the bracket 126a, is a peripherally grooved disk 128 having diametrically opposite arcuate slots 128a which pass through the walls of the groove, and pivotally connected within the groove of this disk are the ends of adjustable links 129 having trunnions 129a resting in said slots. The outer ends of these links are pivoted to arms 130 fixed on the rock shafts 115, for rocking the same. To provide a resilient connection with the arms 130, the outer end portion of each of the links 129 is composed of two telescoping members 129b and 129c, held in normally extended position by means of a coil spring 129d. The relative movement of these members is limited by a stop pin 129e passing through a slot in the inner member and having its ends held in the walls of the outer member. Because of this resilient connection, the trunnions 129a are held against the remote ends of the slots 128a as shown in Figure 27.

Also fixed on the shaft 127, and separated from the disk 128 by the bracket 126a, is a disk 131 similar to the disk 128, as shown in Figure 26, but having a single arcuate slot 131a and connected to this disk in the manner that the links 129 are connected to the disk 128, is an end of an adjustable link 132, its other end being pivoted to an arm 133 on the rock shaft 122, said end including a head 132a slidably mounted between coil springs 132b and 132c in a tubular member 132e having a perforated cap 132f. The link 132 includes a turnbuckle 155 for adjusting the same.

Fixed on the shaft 127 is a crank arm 134, having a handle 135 for rocking the shaft.

Mounted on the outer faces of the projections 103, and in covering relation to the respective steam ports 11 and 14, are boxes 136 and 137, and mounted on the rim 8, in covering relation to the steam ports 12 and 13, respectively, are boxes 138 and 139. Connecting the boxes 136 and 138 is a steam pipe 140 which may be provided with a cut-off valve 141, while a steam pipe 142 connects the boxes 137 and 139. The main steam conduit which receives its supply from a suitable generator, not shown, is indicated at 143 and is provided with branches 144 and 145 leading, respectively, to the boxes 136 and 137. In the junction between the branches 144 and 145 is a rotary valve 146 which directs the steam into either of said branches and connected to this valve, for manipulation thereof, is an upwardly extending T-shaped arm 147 having a longitudinal slot 148. The outer end of this slot is provided with lateral branches 148a and 148b extending in opposite directions along the head of the arm. Mounted on the outer end of the shaft 127, beyond the brackets 126, is an arm 149 having a headed pin 150 at its outer end adapted for movement in the slot 148 and its branches, as shown in Figure 2. The outer end of the arm 147 is provided with a handle 151 by means of which it may be manually rocked, if necessary. Covers 152 protect the parts carried by the projections 103.

The operation of the engine described herein is as follows, it being understood that, as illustrated in the drawings, the rotation will be in an anti-clockwise direction, as viewed in Figure 2. With the valve 146 in the position shown in Figure 25, steam passes from the pipe 143 into the branch 144 to the box 136, thence to the box 138 through the pipe 140, the valve 141 being open. From the boxes the steam passes through the ports 11 and 12 and impacts against the blades 39 of the center or primary rotor. This imparts the initial movement to the drive shaft 15 and likewise all rotors. Having passed the blades 39, the steam is divided at the rib 34 and passes, in opposite directions, through the ports 36, where it is directed rearwardly by passing between the primary reversing blades 46. (See Figure 1.) It then impacts against the stator blades 64 and expands between the same and the concave end faces of the blades 46, increasing the velocity of the rotating parts. Passing between the stator blades, the steam is again directed forwardly by the inclined stator blade sections 65, and thrown against the secondary rotor blades 84, thus again accelerating the rotation of the drive shaft. Not only does the steam now impact against the blades of the secondary rotors, but again expands, this expansion taking place between those blades and the concaved ends of the stator blades. The steam next passes from the secondary rotor blades and is again directed rearwardly by the angle of the sections 85 thereof, so that it impacts against the radial ribs 89, formed on the inner faces of the cover plates 9 and 10 and again expands between these ribs and the concaved ends of the secondary rotor blades, this impacting and expansion imparting further force to the drive shaft. The steam then exhausts through the pipes 23 and 24, the exhaust passage 25, and the outlet 26.

It will be noted, by reference to Figure 3, that the blades of the stators and secondary rotors are gradually increased in area to allow for the reduction in steam pressure resulting from expansion.

When it is desired to reverse the direction of operation of the engine from that indicated in Figures 1 and 2, the attendant swings the arm 147 to the left, by means of the handle 151, until the pin 150 is in the upper end of the slot 148. With the handle 135, he then moves the arm 134 to the right which rocks the shaft 127, causing the disks 128 and 131 to rotate and the arm 149 to move to the left, carrying with it the pin 150 which passes down in the slot 148 and swings the arm 147 to the left. This operation is continued until the handle 135 assumes a position corresponding to that shown in Figure 2, but at the opposite side of the engine. As the pins 129a, of the links 129, are at the remote ends of the slots 128a, the rotation of the disk 128 will cause outward movement of the links 129 which, when the springs 129c have been compressed to a sufficient degree, will cause the shafts 115 to rock and thus force the plungers 106a and 107a inwardly against the tension of the springs 114, until their heads 109 are in the paths of the latches 91 and 96, resulting in the inward swinging of these latches to disengage them from the lugs 94 and 100 in the recesses 90 and 99. Due to the friction of the heads 110 against the latches, the latter, together with the reversing rings in which they are mounted, will be held against movement for a slight period of time. These parts are thus held until the wings of the latches have passed the lugs and the latches will have been carried past the heads of the plungers, whereupon the springs 192 will snap the latches outwardly and cause their wings to engage in the recesses at the opposite sides of the lugs. The movement of the rotors, while the reversing rings are being held, causing the shifting of all of the blades of the rotors, so that they may receive the steam against the faces opposite to those of their former positions. When the pins 129a, at the ends of the links 129, have reached a dead center, they will suddenly pass to the opposite ends of the slots 128a, thus permitting the springs 114 to quickly return the heads of the plungers to their seats.

The disk 131 being also carried by the shaft 127, will rotate with the disk 128 and this will cause an outward movement of the link 132 which will rock the shaft 122 carrying the collars 123, and cause the forks 124 to rotate the stator blade reversing rings 62 through the medium of the pins 71, thus reversing the positions of the stator blades 64.

While the movement of the shaft 127 is causing a reversal of the blades in the manner just described, it is also causing the arm 147 to move to the left, carrying with it the rotary valve 146, which closes the passages leading to the steam pipes 144 and 145, while the various blades are reversing and then admits steam to the pipe 145 and the ports 13 and 14.

It will be noted that the springs 129c, of the links 129, permit of a cushioning effect when the plungers engage the latches, and that the degree of movement of the plungers may be adjusted by means of the turnbuckles 154. It will also be noted that the springs 132a and 132b will provide a resilient connection between the link 132 and the arm 133, to permit of a cushioning effect when the parts for adjusting the blades of the stators have reached their limit of movement.

The valve 141 is provided in order that the steam may be cut off from the port 12, if desired. A similar valve may be placed in the pipe 142. Also, if desired, the rim portions 31 of the sections 27 and 28 of the primary rotor may be undercut to provide a hollow space 56 extending entirely therearound, as shown in Figure 30. This space receives steam through a narrow continuous opening 57 between the outermost portions of the rim members. In this way, the entire rim may be maintained at a high temperature. If found advisable, because of the number of secondary rotors employed, steam may be supplied direct to any of these rotors, through a port in line therewith, provided for the purpose. This will produce a boosting effect, as will be readily understood.

It will also be understood that the engine described herein may be constructed as of the non-reversing type, if desired, in which event all of the blades will be fixed. It will also be understood that numerous changes in the details of construction may be made without departing from the spirit of the invention.

What is claimed is:

1. A rotary engine including a shaft, a rotor carried by the shaft means constructed to direct steam to the rotor, reversible blades carried by the rotor adapted to deflect the steam in a direction opposite to the direction of rotation of the rotor, a stator, reversible blades on the stator adapted to receive steam from the rotor and to change the direction of rotation thereof, and another rotor receiving steam from the stator.

2. A rotary engine including a shaft, a rotor carried by the shaft, flanges on the rotor having steam ports therethrough, blades between the flanges, means constructed to discharge steam against the blades, reversing blades on the rotor adapted to receive steam passing from the ports and arranged to change the direction of travel thereof, and stators adapted to receive steam from said reversing blades.

3. A rotary engine including a shaft, a rotor on the shaft having a rim, flanges on the rim, blades between the flanges and pivoted thereto, means constructed to discharge steam against said blades, other blades pivoted to the rim exteriorly of said flanges and adapted to receive steam passing from the first mentioned blades, means for swinging the blades on their pivots, a stator adjacent the rotor and blades on the stator and adapted to receive steam passing from the second mentioned blades.

4. A rotary engine including a shaft, a rotor on the shaft having a rim, flanges on the rim, reversible blades between the flanges and pivoted thereto, channels in the inner faces of the flanges, rings adjustably mounted in the channels, connections between the rings and the blades, other reversible blades pivoted to the rim, adjustably mounted rings connected to said other blades, means whereby to adjust said rings to reverse the blades, a stator adjacent the rotor, and blades on the stator.

5. A rotary engine including a shaft, a rotor on the shaft having a rim, flanges on the rim, reversible blades between the flanges and pivoted thereto, channels in the inner faces of the flanges, rings adjustably mounted in the channels, connections between the rings and the blades, other reversible blades pivoted to the rim, adjustably mounted rings connected to said other blades, latches carried by the latter rings for holding the same in adjusted positions, means for manipulating said latches and rings whereby to reverse the blades and a stator adjacent the rotor.

6. A rotary engine including a shaft, a rotor carried by the shaft, reversible blades on the rotor, rings for reversing the blades, latches carried by the rings, means for manipulating the latches and rings to reverse the blades, and a stator.

7. A rotary steam engine including a shaft, a stationary member, a rotor carried by the shaft, reversible blades carried by the rotor and movable with respect thereto, rings adjustably mounted on the rotor and connected with the blades, means carried by the rings for locking the same against movement, and means movable into engagement with the locking means whereby to release the same and adjust the rings.

8. A rotary engine including a shaft, a stationary member, a rotor carried by the shaft, reversible blades on the rotor, annular blade reversing means mounted for rotation around the shaft and engaging the blades, operating means for the reversing means carried by the stationary member and movable radially of the shaft into contact with the reversing means for rotating the same to reverse the blades, and means whereby to manipulate the operating means.

9. A rotary steam engine including a shaft, a stationary member, a rotor carried by the shaft, reversible blades carried by the rotor and movable with respect thereto, rings adjustably mounted on the rotor and connected with the blades, means carried by the rings for locking the same against movement, and a plunger slidably mounted on the stationary member movable into engagement with the locking means whereby to release the same and adjust the rings.

10. A rotary engine including a shaft, a rotor on the shaft, flanges on the rotor, reversible blades between the flanges and pivoted thereto, reversing rings adjustably mounted between the flanges, connections between the rings and the blades, other reversible blades pivoted to the rim, adjustably mounted reversing rings connected to said other blades, means whereby to adjust said rings to reverse the blades, a stator adjacent the rotor, and blades on the stator.

11. A rotary engine including a shaft, a rotor on the shaft, flanges on the rotor, reversible blades between the flanges and pivoted thereto, reversing rings adjustably mounted between the flanges, connections between the rings and the blades, other reversible blades pivoted to the rim, adjustably mounted reversing rings connected to said other blades, means connecting the last named reversing rings with the first named reversing rings, means adapted to engage the last named reversing rings for manipulating the same to reverse the blades, a stator adjacent the rotor, and blades on the stator.

12. A rotor for rotary steam engines including a rim, spaced circumscribing flanges on the rim having channels in their confronting faces and having passages therethrough, reversing rings slidably mounted in said channels, pivotally connected reversible blade members between the flanges having their pivots in engagement with said reversing rings, pivots connecting the free ends of the blade members to the flanges at opposite sides of the channels, reversible blades on the rim between said passages, and means for reversing the reversible blades and the reversible blade members.

13. A rotary engine including a shaft, a rotor carried by the shaft, means constructed to direct steam to the rotor, blades on the rotor, a stator adjacent the rotor, blades on the stator, and means on the rotor for directing the steam between and against said stator blades, each of said stator blades having a concave end facing in the direction of travel of the steam.

14. A rotary engine including a shaft, a rotor carried by the shaft, means constructed to direct steam to the rotor, blades on the rotor, a stator adjacent the rotor, blades on the stator, and means on the rotor for directing the steam between and against said stator blades, said stator blades each comprising a pair of members, each of said members having an end connected to an end of the other of said members, the free end of one of said members having a concave end facing in the direction of travel of the steam, and said members being disposed in mutually diverging relation.

15. A rotary engine comprising a stator, blades on the stator, a shaft, a rotor adjacent the stator and carried by the shaft, means constructed to direct steam to the rotor, blades on the rotor extending radially thereof, and other blades on the rotor adapted to receive steam from the first mentioned blades and direct said steam between and against said stator blades, said steam directing blades each having a concave end facing in the direction of travel of the steam.

16. A rotary engine comprising a shaft, a rotor carried by the shaft, means constructed to direct steam to the rotor, blades on the rotor, a stator adjacent the rotor, blades on the stator, blades on the rotor adapted to receive steam from the first-mentioned rotor blades and to direct said steam between and against the rotor blades, a second rotor on the shaft adjacent the stator, blades on the second rotor adapted to receive steam from the stator blades, said last-named blades each having a concave end facing in the direction of travel of the steam, and a stator adapted to receive steam from the second-named rotor.

17. A blade for rotary steam engines comprising a pair of members, each of said members having an end pivoted to the end of the other of said members, and one of said members having a concave end face parallel with the pivot of the members.

18. A blade for rotary steam engines comprising a pair of members, each of said members having an end connected to an end of the other of said members, the free end of one of said members having a concave end face, and said members being disposed in mutually diverging relation.

19. A blade for rotary engines comprising a pair of members disposed in mutually diverging relation, and means connecting an end of one of said members with an end of the other of said members.

20. A rotary engine comprising a shaft, a rotor carried by the shaft, means constructed to direct steam to the rotor, blades on the rotor, a stator adjacent the rotor, blades on the stator, blades on the rotor adapted to receive steam from the first mentioned rotor blades and to direct said steam between and against the rotor blades, a second rotor on the shaft adjacent the stator, blades on the second rotor adapted to receive steam from the stator blades, said last-named blades each comprising a pair of members extending in mutually diverging relation, and a stator adapted to receive steam from the second-named rotor.

21. A rotary engine comprising a shaft, a rotor carried by the shaft, means constructed to direct steam to the rotor, blades on the rotor, a stator adjacent the rotor, blades on the stator, blades on the rotor adapted to receive steam from the first-mentioned rotor blades and to direct said steam between and against the rotor blades, a second rotor on the shaft adjacent the stator, blades on the second rotor adapted to receive steam from the stator blades, said last-named blades each comprising a pair of members extending in mutually diverging relation, one of said members having a concave end facing in the direction of travel of the steam, and a stator adapted to receive steam from said second-named rotor.

LESLIE W. DOWNWARD.